United States Patent
Kamata et al.

(10) Patent No.: US 7,944,673 B2
(45) Date of Patent: May 17, 2011

(54) DRIVING METHOD OF ELECTROMAGNETIC VALVE, ELECTROMAGNETIC VALVE DRIVING UNIT AND APPARATUS FOR COLORING ELECTRIC WIRE

(75) Inventors: Takeshi Kamata, Shizuoka (JP); Keigo Sugimura, Shizuoka (JP); Sei Saito, Shizuoka (JP); Kiyoshi Yagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 889 days.

(21) Appl. No.: 11/628,644

(22) PCT Filed: Jun. 2, 2005

(86) PCT No.: PCT/JP2005/010149
§ 371 (c)(1),
(2), (4) Date: Oct. 9, 2007

(87) PCT Pub. No.: WO2005/121620
PCT Pub. Date: Dec. 22, 2005

(65) Prior Publication Data
US 2008/0212252 A1   Sep. 4, 2008

(30) Foreign Application Priority Data
Jun. 7, 2004   (JP) .................................. 2004-168979

(51) Int. Cl.
*H01H 47/00* (2006.01)
*H01H 9/00* (2006.01)

(52) U.S. Cl. ........ 361/194; 361/182; 361/186; 307/129; 123/490

(58) Field of Classification Search .................. 361/182, 361/183, 186, 154, 152, 194; 307/129; 123/490
See application file for complete search history.

(56) References Cited

U.S. PATENT DOCUMENTS
3,762,683 A   10/1973 Sangl ............................ 251/139
(Continued)

FOREIGN PATENT DOCUMENTS
EP   0 377 449   7/1990
JP   5-111947   5/1993
JP   6-119833   4/1994
(Continued)

OTHER PUBLICATIONS

Supplementary European Search Report mailed Jun. 17, 2010 in corresponding application (3 pages).

*Primary Examiner* — Patrick Salce
(74) *Attorney, Agent, or Firm* — Kratz, Quintos & Hanson, LLP

(57) ABSTRACT

A coloring apparatus 1 includes a coloring nozzle 31 for spouting a coloring material, a signal generator 53, and a controller 19. The coloring nozzle 31 includes an electromagnetic valve 51. The signal generator 53 outputs signals for spouting the coloring material from the coloring nozzle 31 to both a CPU 62 of the controller 19 and a driving circuit 64. The CPU 62 outputs a signal for keeping the electromagnetic valve 51 open to the driving circuit 64 when a frequency of the signals from the signal generator 53 is higher than a specific frequency. When at least one of the signals from the CPU 62 and the signal generator 53 is inputted, the driving circuit 64 applies a spike voltage A and then applies a hold voltage B to a coil 40. While at least one of the signals from the CPU 62 and the signal generator 53 is inputted, the driving circuit 64 applies a spike voltage A and then continuously applies a hold voltage B to a coil 40.

5 Claims, 10 Drawing Sheets

U.S. PATENT DOCUMENTS

| | | | |
|---|---|---|---|
| 4,090,090 A * | 5/1978 | Johnston | 307/87 |
| 4,366,391 A * | 12/1982 | Brightwell | 307/129 |
| 4,970,622 A * | 11/1990 | Buchl | 361/154 |
| 5,818,678 A * | 10/1998 | Berg et al. | 361/152 |
| 7,262,950 B2 * | 8/2007 | Suzuki et al. | 361/139 |
| 2005/0047053 A1 * | 3/2005 | Meyer et al. | 361/139 |

FOREIGN PATENT DOCUMENTS

| | | |
|---|---|---|
| JP | 9-92056 | 4/1997 |
| JP | 2003-240150 | 8/2003 |
| JP | 2004-134371 | 4/2004 |
| WO | WO 03/019580 | 3/2003 |
| WO | WO 2004/015722 | 2/2004 |

* cited by examiner

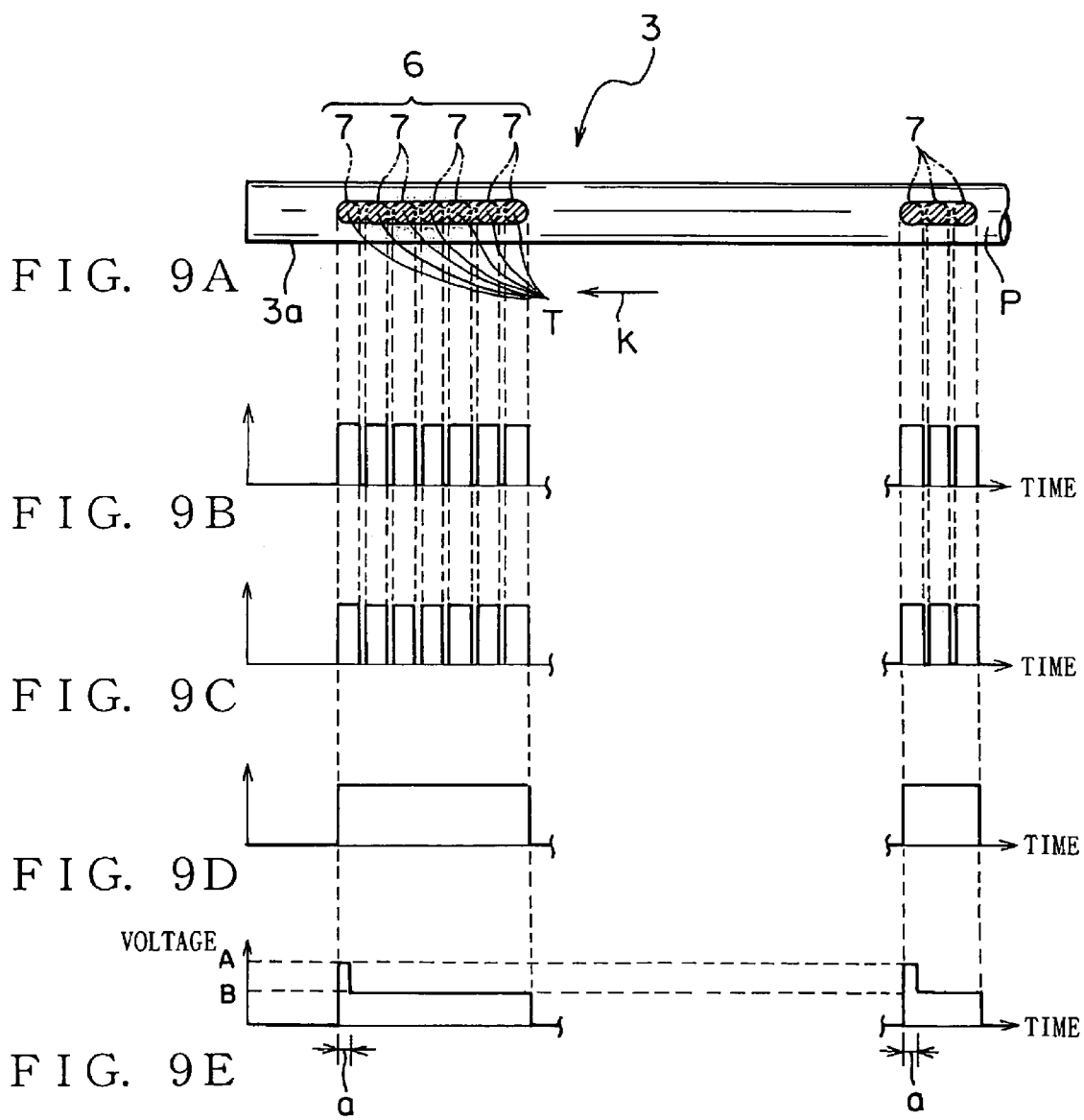

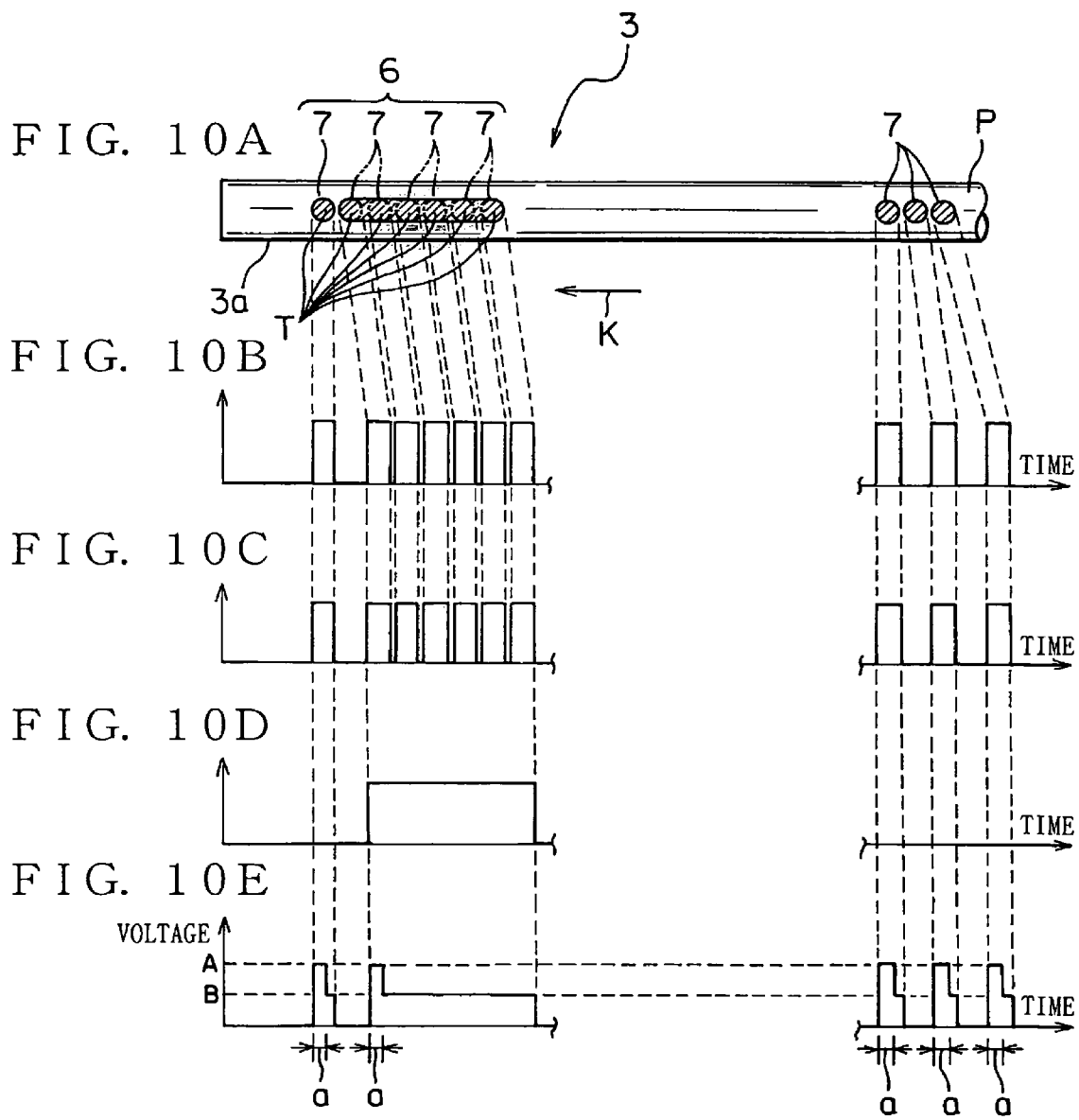

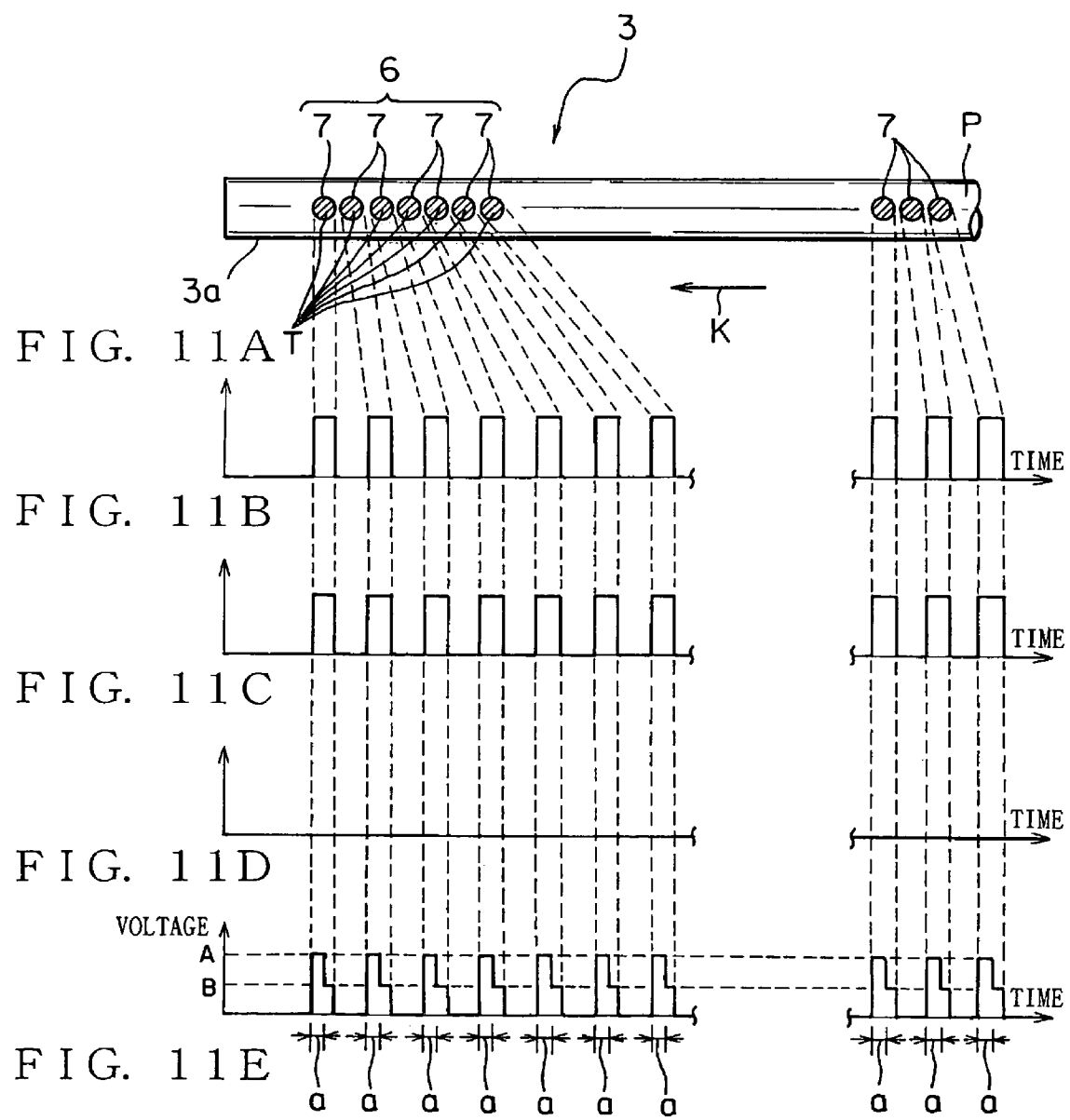

DRIVING METHOD OF ELECTROMAGNETIC VALVE, ELECTROMAGNETIC VALVE DRIVING UNIT AND APPARATUS FOR COLORING ELECTRIC WIRE

TECHNICAL FIELD

This invention relates to a driving method of an electromagnetic valve used for, for example, coloring an electric wire having an electrically conductive core wire and an electrically insulating coating for coating the core wire, a driving unit for driving the electromagnetic valve, and an apparatus for coloring the electric wire.

BACKGROUND ART

Various electronic devices are mounted on a motor vehicle as a mobile unit. Therefore, the motor vehicle includes a wire harness for transmitting power from a power source and control signals from a computer to the electronic devices. The wire harness includes a plurality of electric wires and connectors attached to an end of the wires.

The wire includes an electrically conductive core wire and a coating made of insulating synthetic resin, which coats the core wire. The wire is a so-called coated wire. A connector includes a terminal fitting and a connector housing that receives the terminal fitting therein. The terminal fitting, consisting of electrically conductive sheet metal or the like, is attached to an end of the wire and electrically connected to the core wire of the wire. The connector housing made of electrically insulating synthetic resin is formed in a box-shape. When the connector housing is connected to the electronic devices, each wires is connected to the corresponding electronic device through the terminal fitting, thereby the wire harness transmits the desired electric power and signals to the electronic devices.

When the wire harness is assembled, first the wire is cut into a specific length and then the terminal fitting is attached to an end of the wire after removing the coating near the end. A wire is connected to another wire according to the need. Afterward, the terminal fitting is inserted into the connector housing, thereby assembling the wire harness.

The wire of the wire harness must be distinguished in terms of the size of the core wire, the material of the coating (concerning with alteration in the materials depending upon heat-resisting property), and a purpose of use. The purpose of use means, for example, an air bag, antilock brake system (ABS), control signal such as speed data, and system in a motor vehicle in which the wire is used, such as a power transmission system.

The coating of the wire used in the wire harness has been colored to a desired color by mixing a coloring material of the desired color with synthetic resin which constitutes the coating when the synthetic resin of the coating is applied onto the circumference of the core wire by extrusion (for example, see Patent Documents 1 to 3). In this case, when a color of an outer surface of the wire is altered, it is necessary to halt an operation of an extrusion apparatus that performs the extrusion-coating. That is, whenever the color of the wire is changed, it is necessary to halt an operation of an extrusion apparatus, causing increasing in a time period and labor hour required for the production of the wire and deteriorating in the productivity of the wire.

Alternatively, the coloring material to be mixed has been replaced when the extrusion apparatus is performing the extrusion-coating. In this case, right after changing the color of the coloring material, a wire, in the color of the synthetic resin of which a coloring material before the replacement and a coloring material after the replacement are mixed, has been inevitably manufactured, causing the deterioration in the yield of the material of the wire.

In order to prevent the deterioration in the productivity of the wire and in the yield of the material of the wire, the present applicant proposed a method, in which monochromatic wire is produced, then the outer surface of the wire is colored with a desired color according to the need, thereby assembling a wire harness (see Patent Document 4). Alternatively, the present applicant proposed an apparatus for coloring wire, by which upon coloring a monochromatic wire, a liquid coloring material is spouted onto the outer surface of the wire with a specific amount thereof at a time so as to allow the spouted coloring material to adhere to the outer surface of the wire, thereby coloring the wire with the desired color (see Patent Document 5).

The coloring apparatus described above includes a coloring unit that spouts the liquid coloring material onto the outer surface of the wire. The coloring unit includes an electromagnetic valve (solenoid valve) that spouts the coloring material onto the outer surface of the wire when the valve is open, and stops spouting the coloring material onto the outer surface of the wire when the valve is closed. The electromagnetic valve is to be opened or closed according to whether voltage is applied to the solenoid or not.

For opening the electromagnetic valve of the apparatus for coloring wire described in the Patent Document 5, a relatively high voltage (hereafter referred to as "spike voltage" in this description) is first applied for a predetermined period. Then, for keeping the electromagnetic valve open, relatively low voltage (hereinafter referred to as "hold voltage" in this description, of course the hold voltage is lower than the spike voltage) is applied for a predetermined period. Thus, the coloring unit spouts the liquid coloring material onto the outer surface of the wire by opening the electromagnetic valve. Then, after drying a droplet of the coloring material deposited on the outer surface of the wire, the outer surface of the wire is colored in a desired color, and marked with a desired mark.

[Patent Document 1] JP-A, H05-111947
[Patent Document 2] JP-A, H06-119833
[Patent Document 3] JP-A, H09-92056
[Patent Document 4] WO03019580
[Patent Document 5] Japanese Patent Application No. 2003-193904

Preferably, the apparatus for coloring wire described above is mounted on various processing apparatuses for processing electric wire, for example, a wire cutting apparatus that cuts the wire to a predetermined length, and mounts a terminal fitting on an end of the cut electric wire. The processing apparatus for electric wire transfers the electric wire in a longitudinal direction, or stops transferring the wire for processing the wire in various ways, for example, cutting the wire or mounting the terminal fitting described above. Accordingly, a transfer speed of the wire is changed rapidly.

On the other hand, for coloring the outer surface of the wire in a specific pattern even if the transfer speed of the wire is changed, the apparatus for coloring wire includes, for example, an encoder for detecting the transfer speed or transferred length of the wire. Further, the apparatus for coloring wire changes time intervals (frequency) of opening the electromagnetic valve according to the transfer speed or transferred length of the wire measured by the encoder for coloring the outer surface of the wire in a specific pattern.

However, sometimes the transfer speed of the wire moved by the processing apparatus is so increased to make a frequency of applying the voltage higher than an upper-limit frequency in which the electromagnetic valve is able to be opened and closed. In this case, the electromagnetic valve keeps opening when the frequency is higher than the upper-limit frequency. Further, the spike voltage is applied to the solenoid of the electromagnetic valve a plurality of times when the frequency is higher than the upper-limit frequency.

In this case, since the electromagnetic valve keeps opening when the spike voltage is applied to the solenoid a plurality of times, the solenoid may be heated. Resultingly, the repeatedly heated solenoid may reduce a lifetime of the electromagnetic valve.

Accordingly, an object of this invention is to provide a driving method of an electromagnetic valve, a driving unit for driving the electromagnetic valve, and an apparatus for coloring electric wire to allow a lifetime of the electromagnetic valve to increase.

DISCLOSURE OF INVENTION

In order to attain the object, according to the present invention as claimed in claim 1, there is provided a driving method of an electromagnetic valve comprising the steps of:

applying a spike voltage to a solenoid for opening the valve; and applying a hold voltage for keeping the valve open, said hold voltage being lower than the spike voltage, whereby when a requested valve open-close frequency is higher than an upper-limit of a valve open-close frequency, the spike voltage is first applied, then the hold voltage is continuously applied to the solenoid.

According to the present invention as claimed in claim 2, there is provided a driving unit for driving an electromagnetic valve comprising:

an electromagnetic valve including a solenoid; and a controller including a valve driver for applying a spike voltage to the solenoid when opening the valve, and applying a hold voltage to the solenoid when keeping the valve open, whereby said controller further includes a voltage superimposing unit to make the valve driver keep applying the hold voltage to the solenoid, when a requested valve open-close frequency is higher than an upper-limit of a valve open-close frequency.

According to the present invention as claimed in claim 3, there is provided an apparatus for coloring electric wire comprising:

a coloring unit for coloring an electric wire by spouting a liquid coloring material onto an outer surface of the wire, said spouted coloring material adhering to the outer surface of the wire;

an electromagnetic valve included in the coloring unit, said electromagnetic valve being open to spout the coloring material onto the outer surface of the wire, and closed to stop spouting the coloring material onto the outer surface of the wire; and a controller included in the coloring unit, and including a valve driver, said valve driver applying a spike voltage to a solenoid in order to open the valve and a hold voltage to the solenoid in order to keep the valve open, whereby said controller further includes a voltage superimposing unit to make the valve driver keep applying the hold voltage to the solenoid, when a requested valve open-close frequency is higher than an upper-limit of a valve open-close frequency.

According to the present invention as claimed in claim 4, there is provided the apparatus for coloring electric wire as claimed in claim 3, further comprising a signal generator for generating a signal to spout the coloring material from a coloring nozzle, and outputting the signal to both the voltage superimposing unit and the valve driver, wherein when a valve open-close frequency is higher than an upper-limit of a valve open-close frequency, said voltage superimposing unit outputs a signal to the valve driver for keeping the valve open, wherein when receiving at least one of the signal from the signal generator to spout the coloring material from the coloring nozzle and the signal from the voltage superimposing unit to keep the valve open, the valve driver first applies the spike voltage to the solenoid, then continuously applies the hold voltage to the solenoid during a period of receiving at least one of the signals.

According to the present invention as claimed in claim 5, there is provided the apparatus for coloring electric wire as claimed in claim 4, further comprising:

a transporter for transporting the wire in a longitudinal direction of the wire; and a detector, included in the signal generator, for detecting an transferred length of the wire, wherein the signal generator generates a signal to spout the coloring material from the coloring nozzle based on the transferred length of the wire detected by the detector.

According to the present invention as claimed in claim 1, the hold voltage is continuously applied to the solenoid when the requested valve open-close frequency is higher than the upper-limit of the valve open-close frequency which the valve can perform. Therefore, when the requested frequency is higher than the upper-limit of the valve open-close frequency, a total amount of voltage applied to the solenoid to open the valve is reduced.

According to the present invention as claimed in claim 2, the controller makes the valve driver keep applying the hold voltage to the solenoid, when a requested valve open-close frequency is higher than an upper-limit of a valve open-close frequency. Therefore, when the requested frequency is higher than the upper-limit of the valve open-close frequency, a total amount of voltage applied to the solenoid when the valve is open is reduced.

According to the present invention as claimed in claim 3, the controller makes the valve driver keep applying the hold voltage to the solenoid, when the requested valve open-close frequency is higher than an upper-limit of a valve open-close frequency. Therefore, when the requested frequency is higher than the upper-limit of the valve open-close frequency, a total amount of voltage applied to the solenoid when the valve is open is reduced.

Incidentally, in this specification, the coloring material means a liquid substance, in which a coloring material (organic substance for use in industry) is dissolved and dispersed in water or other solvent. The organic substance described above is a dye or a pigment (most of them being organic substances and synthetic substances). Sometimes, a dye is used as a pigment and a pigment is used as a dye. As a concrete example, the coloring material may be a coloring liquid or coating material. The coloring liquid is a liquid, in which a dye, as the coloring material, is dissolved or dispersed in a solvent. The coating material is a material, in which a pigment, as the coloring material, is dispersed in a liquid dispersion as the solvent. When the outer surface of the wire is colored with a coloring liquid, the dye permeates into the coating of the wire. When the outer surface of the wire is colored with a coating material, the pigment adheres to the outer surface without permeating into the coating of the wire. In the specification, "to color the outer surface of the wire" means to dye a part of the outer surface of the coating of the wire with a dye or to coat a part of the outer surface of the coating of the wire with a pigment.

Preferably, the solvent and liquid dispersion have an affinity to the synthetic resin that constitutes the coating in order to securely permeate the dye into the coating or to allow the pigment to securely adhere to the outer surface of the coating.

In this specification, "spouting" means that the liquid coloring material in a state of the liquid drop is ejected vigorously from the coloring nozzle onto the outer surface of the wire.

According to the present invention as claimed in claim 4, an FV (frequency to voltage) converter outputs a signal for keeping the valve open to the valve driver when the requested valve open-close frequency is higher than the upper-limit frequency. When the signal is inputted to the valve driver from the FV converter, the valve driver first applies the spike voltage then applies the hold voltage continuously to the solenoid. Therefore, the controller makes the valve driver keep applying the hold voltage to the solenoid, when the requested valve open-close frequency is higher than the upper-limit of the valve open-close frequency. Therefore, when the requested frequency is higher than the upper-limit of the valve open-close frequency, a total amount of voltage applied to the solenoid when the valve is open is reduced.

Further, when neither the signal from the FV converter nor the signal from the signal generator is inputted into the valve driver, the valve driver stops applying the hold voltage to the solenoid.

According to the present invention as claimed in claim 5, the signal generator generates a signal for spouting the coloring material according to the transferred length of the wire. Therefore, it is possible to reduce a time interval of spouting when the transfer speed of the wire is increased, and increase the time interval of spouting when the transfer speed of the wire is reduced. Therefore, even if the transfer speed is changed, a specific marking is marked on the wire.

Further, according to the present invention, preferably, the electric wires constituting a wire harness arranged in various machines such as a vehicle are colored (marked). In this case, time for keeping the valve open by applying the hold voltage to the solenoid the is preferably a short time, for example, 0.10 millisecond to 0.3 millisecond. Namely, the present invention is suitable for spouting a minute quantity of the liquid coloring material onto the outer surface of the wire in a short time interval.

BRIEF DESCRIPTION OF THE DRAWINGS

FIG. 5A is a sectional view showing a closed electromagnetic valve of the coloring nozzle shown in FIG. 4. FIG. 5B is a sectional view showing an opened electromagnetic valve of the coloring nozzle shown in FIG. 4.

FIG. 7A is a perspective view showing the electric wire colored by the apparatus for coloring electric wire shown in FIG. 1. FIG. 7B is a plane view of the wire shown in FIG. 7A.

FIGS. 9A, 9B, 9C, 9D, and 9E are explanatory views showing a signal for forming a mark shown in FIGS. 7A and 7B on the wire. FIG. 9A is a plane view of the wire shown in FIG. 7B. FIG. 9B is an explanatory view showing a pulse signal outputted from an encoder to a design memory unit, both shown in FIG. 6. FIG. 9C is an explanatory view showing a signal pulse outputted from the design memory unit to a CPU and an OR-circuit both shown in FIG. 6 when the signal shown in FIG. 9B is inputted to the design memory unit. FIG. 9D is an explanatory view showing a signal outputted from the CPU to the OR-circuit when the signal shown in FIG. 9C is inputted to the CPU. FIG. 9E is an explanatory view showing a voltage pattern applied by the OR-circuit to the coil of the electromagnetic valve of the coloring nozzle when the signal shown in FIG. 9D is inputted to the OR-circuit.

FIGS. 10A, 10B, 10C, 10D, and 10E are explanatory views showing another signal for forming a mark shown in FIGS. 7A and 7B on the wire. FIG. 10A is a plane view of the wire shown in FIG. 7B. FIG. 10B is an explanatory view showing a pulse signal outputted from the encoder to the design memory unit both shown in FIG. 6. FIG. 10C is an explanatory view showing a signal pulse outputted from the design memory unit to the CPU and the OR-circuit both shown in FIG. 6 when the signal shown in FIG. 10B is inputted to the design memory unit. FIG. 10D is an explanatory view showing a signal outputted from the CPU to the OR-circuit when the signal shown in FIG. 10C is inputted to the CPU. FIG. 10E is an explanatory view showing a voltage pattern applied by the OR-circuit to the coil of the electromagnetic valve of the coloring nozzle when the signal shown in FIG. 10D is inputted to the OR-circuit.

FIGS. 11A, 11B, 11C, 11D, and 11E are explanatory views showing the other signal for forming a mark shown in FIGS. 7A and 7B on the wire. FIG. 11A is a plane view of the wire shown in FIG. 7B. FIG. 11B is an explanatory view showing a pulse signal outputted from the encoder to the design memory unit both shown in FIG. 6. FIG. 11C is an explanatory view showing a signal pulse outputted from the design memory unit to the CPU and the OR-circuit both shown in FIG. 6 when the signal shown in FIG. 11B is inputted to the design memory unit. FIG. 11D is an explanatory view showing a signal outputted from the CPU to the OR-circuit when the signal shown in FIG. 11C is inputted to the CPU. FIG. 11E is an explanatory view showing a voltage pattern applied by the OR-circuit to the coil of the electromagnetic valve of the coloring nozzle when the signal shown in FIG. 11D is inputted to the OR-circuit.

BEST MODE FOR CARRYING OUT THE INVENTION

In the following, one embodiment of an apparatus for coloring electric wire according to the present invention (hereafter referred to as "coloring apparatus") will be explained with reference to FIGS. 1 to 11. The coloring apparatus 1 cuts an electric wire 3 to a predetermined length, and marks a mark 6 on an outer surface 3a of the wire 3. Namely, the coloring apparatus 1 colors (marks) the outer surface 3a of the wire 3.

Figure 7A:
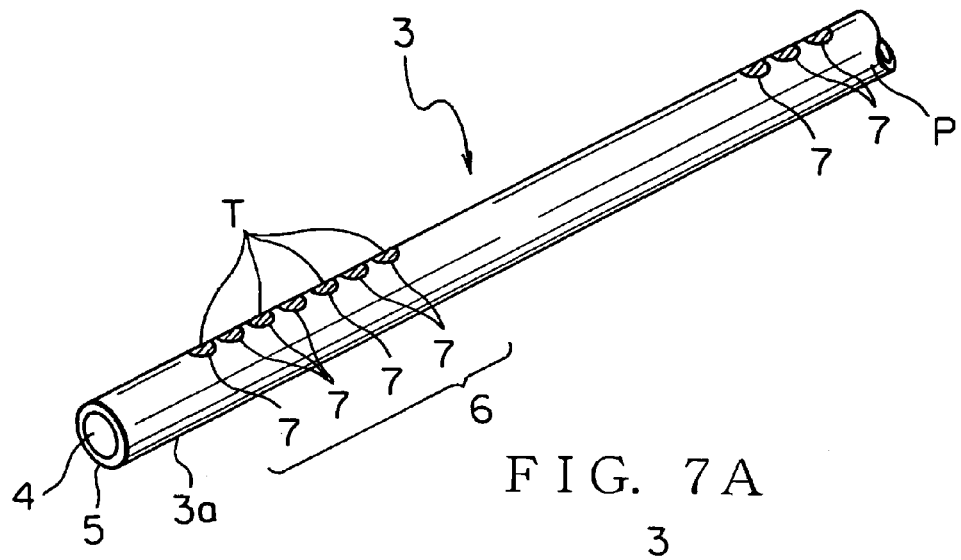
FIGS. 7A and 7B are explanatory views showing the electric wire colored by the apparatus for coloring electric wire shown in FIG. 1.

The wire 3 constitutes a wire harness arranged in a vehicle as a mobile unit. As shown in FIG. 7A, the wire 3 includes an electrically conductive core wire 4 and an electrically insulating coating 5. A plurality of element wires are bundled to form the core wire 4. Each element wire of the core wire 4 is made of electrically conductive metal. The core wire 4 may be constituted by a single element wire. A coating 5 is made of synthetic resin such as polyvinyl chloride (PVC). The coating 5 coats the core wire 4. Therefore, the outer surface 3a of the wire 3 means an outer surface of the coating 5.

The coating 5 has a one color (hereafter referred to as "monochrome color") P such as white. That is, the outer surface 3a of the coating 5, namely, the outer surface 3a of the wire 3 has a monochrome color P. A desired coloring material may be mixed with the synthetic resin of the coating 5 so as to make the color of the outer surface 3a of the wire 3 be the monochrome color P, or alternatively, the monochrome color P may be set as the color of the synthetic resin itself without adding a coloring material to the synthetic resin of the coating 5. In the latter case, the outer surface 3a of the wire 3 is not colored, namely, the coating 5 is not colored.

Figure 7B:
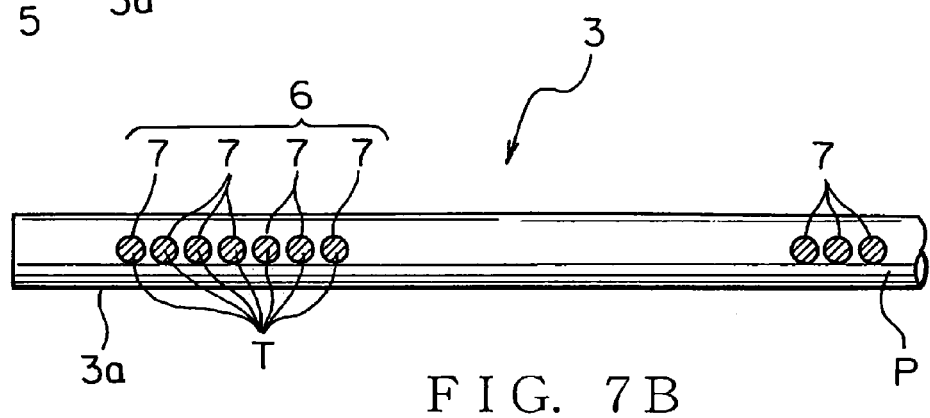
Figure 8:
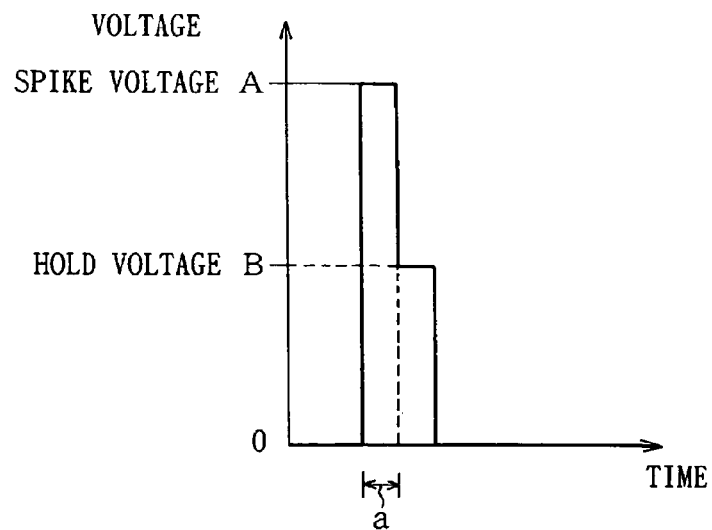
FIG. 8 is an explanatory view showing a voltage pattern applied to a coil of the coloring nozzle shown in FIG. 4.

On the outer surface 3a of the wire 3, there are formed a mark 6 consisting of a plurality of spots 7. The spot 7 has a color T (indicated with parallel oblique lines in FIG. 7), which is different from the monochrome color P. The spot 7 is round in the plan view as shown in FIG. 7. Seven spots 7 are arranged in the longitudinal direction of the wire 3 at even intervals, and three spots are arranged in the longitudinal direction of the wire 3 at the same interval, a distance between the seven spots and the three spots is wider than the interval. Each interval between the centers of the spots 7 situated adjacently to each other is predetermined.

A plurality of the wires 3 are bundled, and connectors are attached to respective ends of the wires 3, thereby constructing a wire harness. The connectors are coupled with respective mating connectors of various electronic instruments in a motor vehicle and the like, thereby the wire harness (namely, the wires 3) transmits various signals and electric power to the electronic instruments.

The wires 3 are distinguishable from one another by changing a color T of each spot 7 of the mark 6. In the figure, as an example, the color T of all of the spots 7 of the wire 3 is set the same, however, the color T may be changed for the respective spots 7 as required. The color T is used to distinguish types of the wires in a wire harness or systems. That is, the color T is used to distinguish the types of the wires in the wire harness or the purposes of use.

Figure 1:
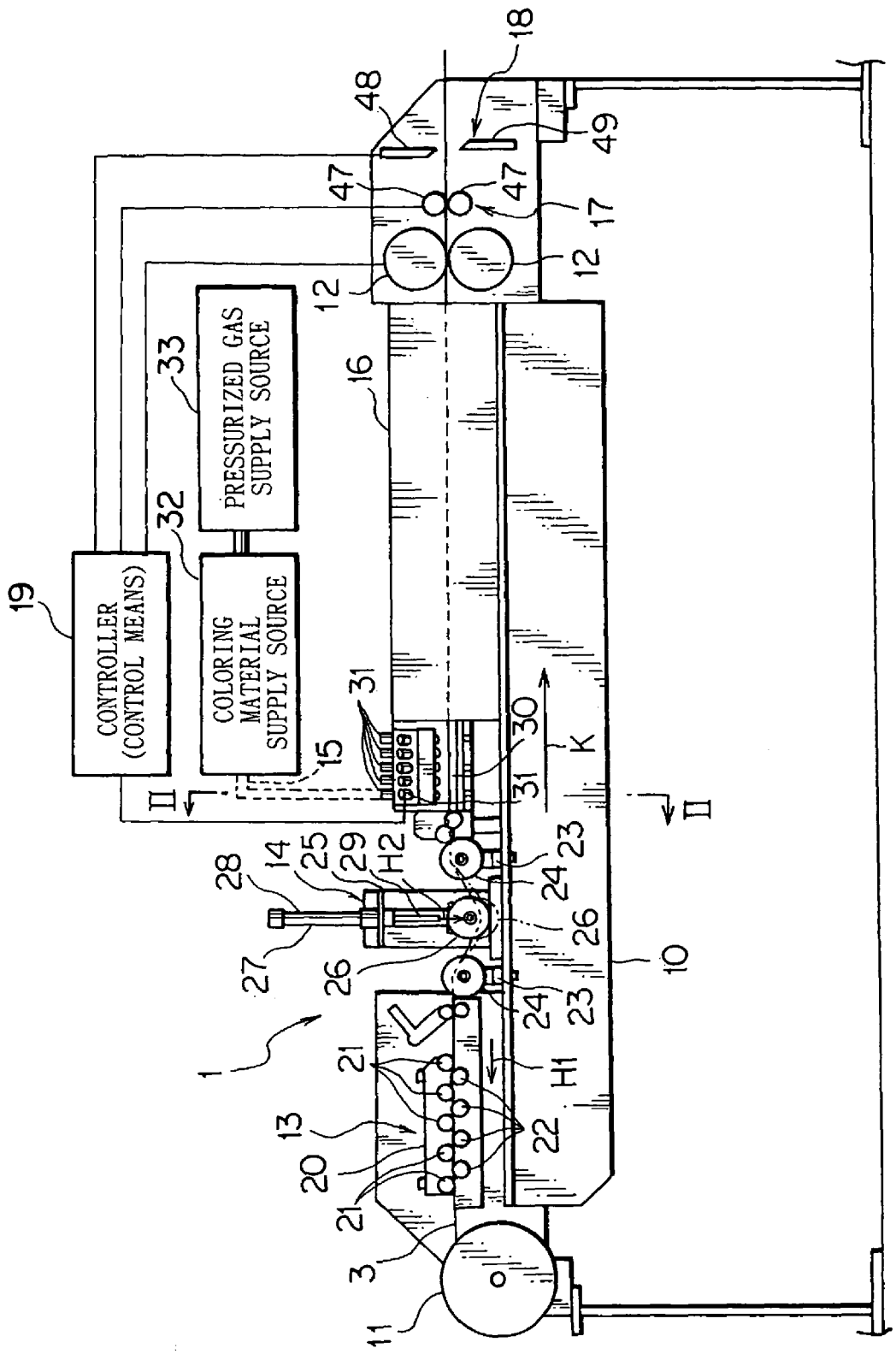
FIG. 1 is a side view showing an apparatus for coloring electric wire according to an embodiment of the present invention.

As shown in FIG. 1, the coloring apparatus 1 includes a frame 10 as a main body of the apparatus, a guide roll 11, a pair of delivery rolls 12 as a transporter, a straightening unit 13 for straightening the wire, a slack absorbing unit 14 as a slack absorber, a coloring unit 15, a duct 16, an encoder 17 as a detector (shown in FIG. 6), a design memory unit 52 (shown in FIG. 6), a cutting machine 18 as a processor, and a controller 19 as a controlling machine.

The frame 10 is installed on a floor of such as a factory. The frame 10 extends horizontally. The guide roll 11 is mounted rotatably on an end of the frame 10. The continuous wire 3 having no mark 6 is wound on to the guide roll 11. The guide roll 11 transfers the wire 3 to the straightening unit 13, the slack absorbing unit 14, the coloring unit 15, the duct 16, the encoder 17, and the cutting machine 18 in sequence.

The pair of delivery rolls 12 is mounted on the other end of the frame 10. The pair of delivery rolls 12 is rotatably supported by the frame 10, and arranged vertically. The delivery rolls 12 are rotated the same number of revolutions in a direction opposite to each other by such as a motor (not shown). The pair of delivery rolls 12 catches the wire 3, and pulls the wire 3 from the guide roll 11 in a longitudinal direction of the wire 3.

The delivery rolls 12 works as a pulling machine to pull the wire 3 in the longitudinal direction of the wire 3. Thus, the delivery rolls 12 transfers the wire 3 in the longitudinal direction of the wire 3 to move the wire relatively to a later-described coloring nozzle 31 of the coloring unit 15 in the longitudinal direction. Therefore, the wire 3 is transferred along an arrow K in FIG. 1 from the guide roll 11 to the delivery rolls 12. The arrow K indicates a transferring direction of the wire 3.

The straightening unit 13 is mounted on the delivery rolls 12 side of the guide roll 11, in between the delivery rolls 12 and the guide roll 11. Namely, the straightening unit 13 is disposed downstream of the guide roll 11 and upstream of the delivery rolls 12 in the transferring direction K of the wire 3. The straightening unit 13 includes a plate-shaped unit body 20, a plurality of first rollers 21, and a plurality of second rollers 22. The unit body 20 is fixed to the flame 10.

The first and second rollers 21, 22 are supported rotatably by the unit body 20, respectively. A plurality of the first rollers 21 are arranged horizontally (in the transferring direction K), over the wire 3. A plurality of the second roller 22 are arranged horizontally (in the transferring direction K), under the wire 3. As shown in FIG. 1, the first and second rollers 21, 22 are arranged in a staggered fashion.

The straightening unit 13 puts the wire 3, being transferred by the delivery rolls 12 from the guide roll 11, between the first and second rollers 21, 22. Then, the straightening unit 13 makes the wire 3 straight. Further, the straightening unit 13 gives friction to the wire 3 by putting the wire 3 between the first and second rollers 21, 22. Namely, the straightening unit 13 gives to the wire 3 first energizing force H1 in a direction opposite to the pulling force applied from the delivery rolls 12 to the wire 3 (the transferring direction K). The first energizing force H1 is smaller than the pulling force applied from the delivery rolls 12 to the wire 3. Therefore, the straightening unit 13 tenses the wire 3 in the longitudinal direction of the wire 3.

The slack absorbing unit 14 is mounted on the delivery rolls 12 side of the straightening unit 13, in between the straightening unit 13 and the delivery rolls 12. Namely, the slack absorbing unit 14 is disposed downstream of the straightening unit 13 and upstream of the delivery rolls 12 in the transferring direction K of the wire 3. The slack absorbing unit 14 is arranged between the straightening unit 13 and the later-described coloring nozzle 31 of the coloring unit 15.

As shown in FIG. 1, the slack absorbing unit 14 includes a pair of guiding rollers 24, a pair of supporting frames 23 for supporting the pair of guiding rollers 24, a movable roller 26, a supporting frame 25 for supporting the movable roller 26, and an air cylinder 27 as an energizing member. The supporting frames 23 are fixed on the frame 10. The supporting frames 23 are vertically arranged upward from the frame 10. A space exists between the pair of supporting frames 23 in the transferring direction K of the wire 3.

The supporting frames 23 rotatably support the pair of guiding rollers 24. The guiding rollers 24 are disposed under the wire 3, and guide the wire 3 so as not to make the wire 3 swerve from the transferring direction K by outer peripheral walls of the guiding rollers 24 contacting the wire 3. Thus, the guiding rollers 24 guide the wire 3 in the transferring direction K.

The supporting frame 25 for the movable roller 26 is fixed on the frame 10. The supporting frame 25 is vertically arranged upward from the frame 10. The supporting frame 25 for the movable roller 26 is disposed in the middle of the pair of supporting frames 23 for the guiding rollers 24.

The movable roller 26 is supported rotatably by the supporting frame 25 for the movable roller 26 and movably in a vertical direction along the supporting frame 25. The movable roller 26 is disposed over the wire 3. The movable roller 26 is supported movably in the vertical direction, namely, supported movably in a direction orthogonal to the transferring direction K of the wire 3. Further, the roller 26 is disposed in the middle of the pair of guiding rollers 24.

The air cylinder 27 includes a cylinder body 28 and an extendable rod 29 being extendable from the cylinder body 28. The cylinder body 28 is fixed on the supporting frame 25 for the movable roller 26, and disposed over the wire 3. The extendable rod 29 is expandable downward from the cylinder body 28. Namely, the extendable rod 29 is expandable from the cylinder body 28 toward the wire 3.

The movable roller 26 is attached to the extendable rod 29. By supplying a compressed gas to an interior of the cylinder body 28, the air cylinder 27 energizes the extendable rod 29, namely, the movable roller 26 with second energizing force H2 (shown in FIG. 1) downward in a direction orthogonal to the transferring direction K. Therefore, the air cylinder 27 energizes the movable roller 26 with the second energizing force H2 toward the wire 3. The second energizing force H2 is smaller than the first energizing force H1.

When the delivery rolls 12 temporally stops transferring the wire 3 for cutting the wire 3 by a pair of later-described cutting blades 48, 49 of the cutting machine 18 approaching each other, the wire 3 still transfers along the arrow K by an inertia force, so that the wire 3 slacks in between the pair of guiding rollers 24. In this moment, since the air cylinder 27 is energizing the movable roller 26 with the second energizing force H2 in the slack absorbing unit 14 having above-described constitution, the extendable rod 29 of the air cylinder 27 extends to move the movable roller 26, for example, to a position shown as a two-dot chain line in FIG. 1. Then, the slack absorbing unit 14 energizes the wire 3 slacking in between the pair of guiding rollers 24 as described above in the direction orthogonal to the transferring direction K and absorbs the slack to keep the wire 3 under tension.

The coloring unit 15 is mounted on the delivery rolls 12 side of the slack absorbing unit 14, and mounted in between the slack absorbing unit 14 and the pair of delivery rolls 12. Namely, the coloring unit 15 is disposed downstream of the slack absorbing unit 14 and upstream of the delivery rolls 12 in the transferring direction K of the wire 3. Therefore, the coloring unit 15, namely, the later-described coloring nozzle 31 is disposed between the pair of delivery rolls 12 and the straightening unit 13.

Figure 2:
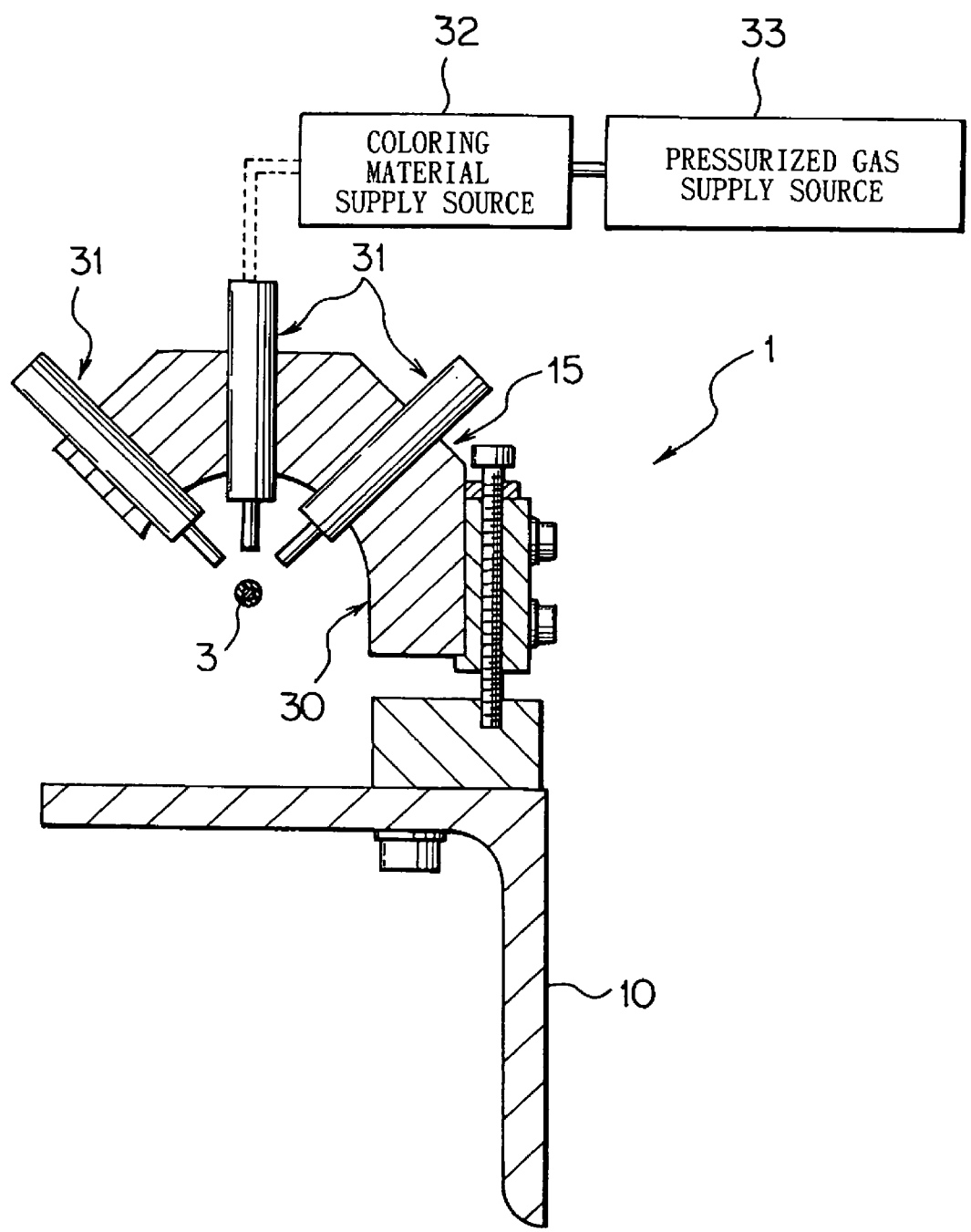
FIG. 2 is a sectional view showing a coloring unit of the apparatus for coloring electric wire taken on line II-II in FIG. 1.

As shown in FIG. 2, the coloring unit 15 includes a unit body 30, a plurality of the coloring nozzles 31, a plurality of coloring material supply sources 32 (only one of the sources 32 is shown in FIG. 2), and pressurized gas supply sources 33. The unit body 30 supports a plurality of the coloring nozzles 31.

Figure 4:
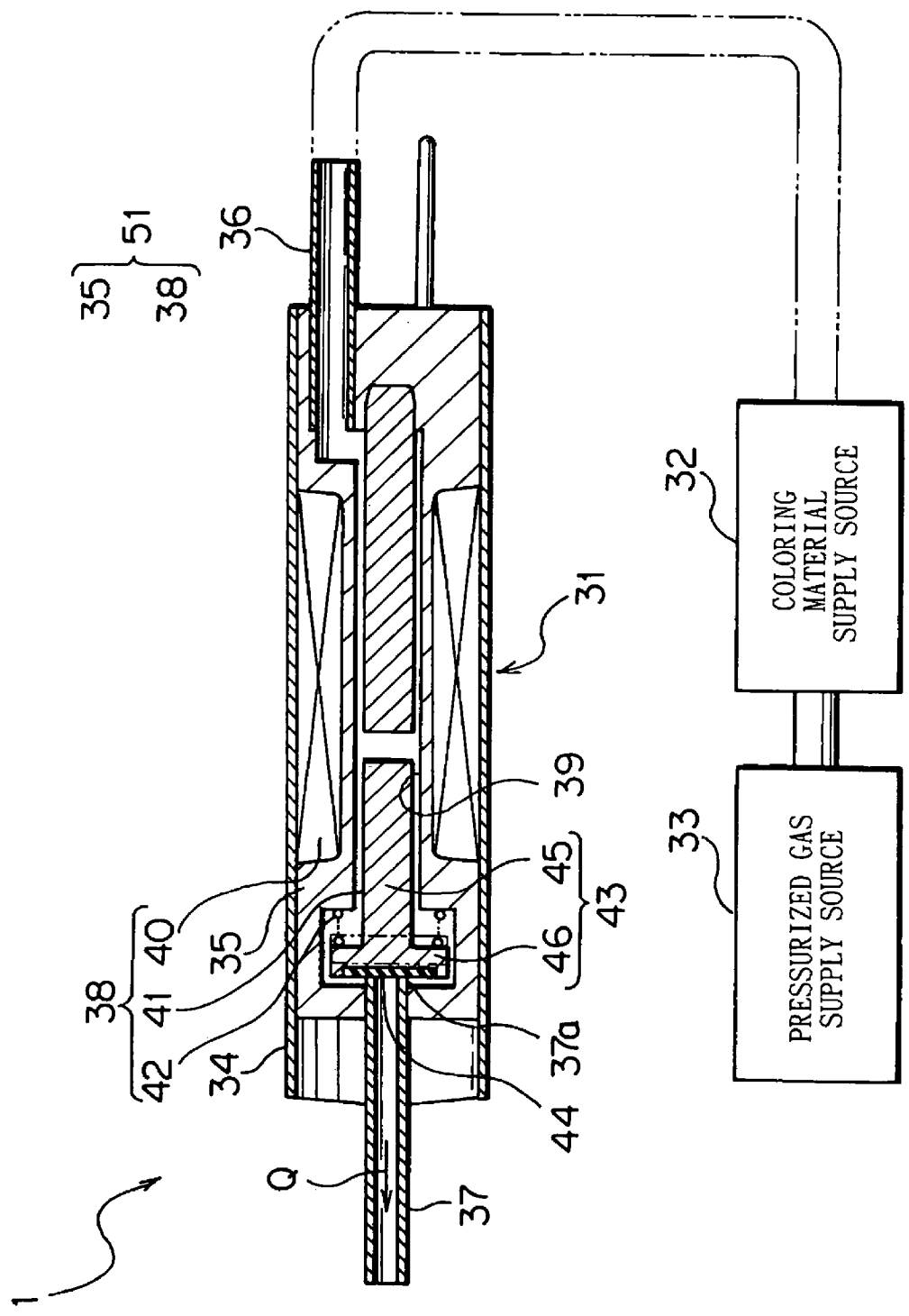
FIG. 4 is an explanatory view showing a configuration of the coloring nozzle of the coloring unit shown in FIG. 2.

As shown in FIG. 4, each coloring nozzle 31 includes a cylinder-shaped nozzle body 34, an inlet pipe 36, a nozzle member 37 as a nozzle, and an electromagnetic valve 51.

The inlet pipe 36 communicates with a later-described flow pass 39, and leads the coloring material from the coloring material supply source 32 to the flow pass 39, namely, a later-described insert member 35. The inlet pipe 36 leads the coloring material from the coloring material supply source 32 to an interior of the electromagnetic valve 51.

The nozzle member 37 is formed in a cylindrical shape and communicates with the channel 39. The nozzle member 37 leads the coloring material in the flow pass 39, namely, in the electromagnetic valve 51 to an outside of the coloring nozzle 31. An inner diameter of the nozzle member 37 is, for example as shown in FIG. 4, 65 micrometer, and is smaller than an inner diameter of the nozzle body 34, namely, an outer diameter of the flow pass 39. The nozzle member 37 is coaxial to the nozzle body 34. The nozzle member 37 is made of stainless steel. The coloring material flows through the interior of the nozzle member 37 along an arrow Q (shown in FIGS. 4 and 5) parallel to a longitudinal direction of the nozzle member 37.

The electromagnetic valve 51 includes the insert member 35 received in the interior of the nozzle body 34 and a valve mechanism 38. The insert member 35 is formed in a cylindrical shape. The flow pass 39 is formed inside the insert member 35, and the coloring material flows through the flow pass 39. The flow pass 39 is filled with the coloring material supplied from the coloring material supply source 32. The insert member 35 is a receiver for receiving the liquid coloring material described in this description.

As shown in FIG. 4, the valve mechanism 38 includes a coil 40 as a solenoid, a valve body 41, and a coil spring 42. The coil 40 is formed outside the flow pass 39 and embedded inside the insert member 35. When a signal is inputted to the driving circuit 64, A voltage is applied to the coil 40 from a later-described driving circuit 64. The valve body 41 includes an electrically conductive body 43 and a valve 44. The conductive body 43 integrally includes a cylinder 45 and a disc 46 continuing to an end of the cylinder 45.

The disc 46 of the conductive body 43 faces the base end 37a of the nozzle member 37. The conductive body 43 is received in the flow pass 39 in a state that the longitudinal direction of the cylinder 45 is parallel to that of the nozzle body 34. The conductive body 43, namely, the valve body 41 is formed movably in the longitudinal direction of the cylinder 45, namely, the longitudinal direction of the nozzle body 34.

The valve 44 is attached to the disc 46 of the conductive body 43. That is, the valve 44 is received in the insert member 35. The valve element 44 faces the base end 37a of the nozzle member 37. The valve 44 approaches or leaves the base end 37a of the nozzle member 37.

When the valve 44 contacts the base end 37a of the nozzle member 37, the coloring material in the flow pass 39 is prevented from entering into the nozzle member 37, that is, the watertight condition between the valve 44 and the base end 37a is attained. When the valve element 44 leaves the base end 37a of the nozzle member 37, the coloring material is allowed to flow through the nozzle member 37 so as to be spouted toward the outer surface 3a of the wire 3.

Figure 5A:
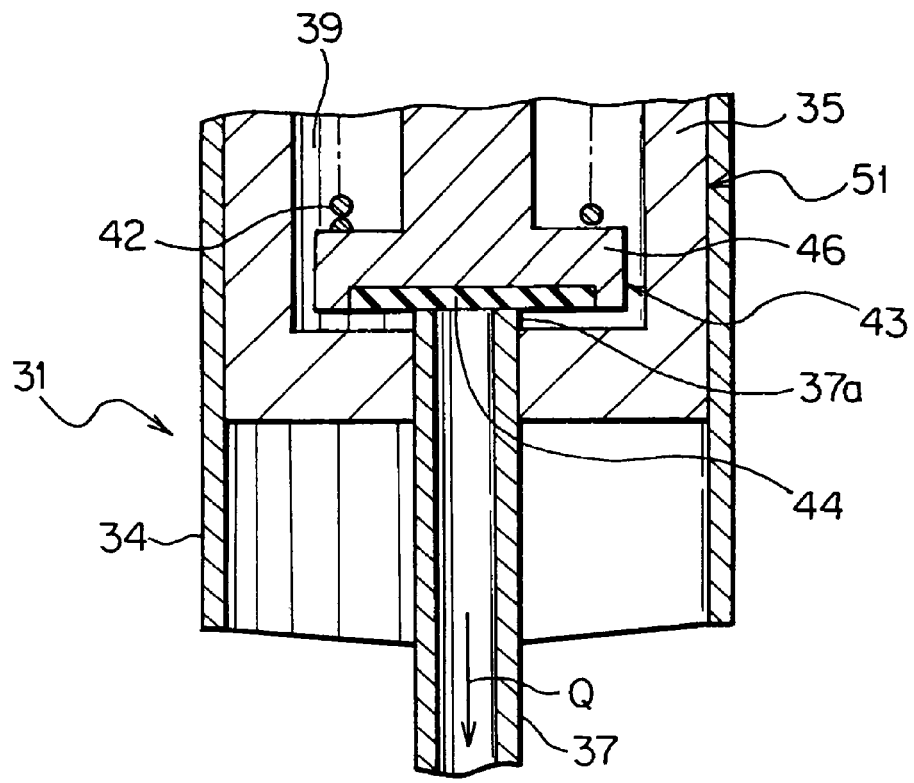
FIGS. 5A and 5B are partially sectional views showing a part of the coloring nozzle of the coloring unit shown in FIG. 4.
Figure 5B:
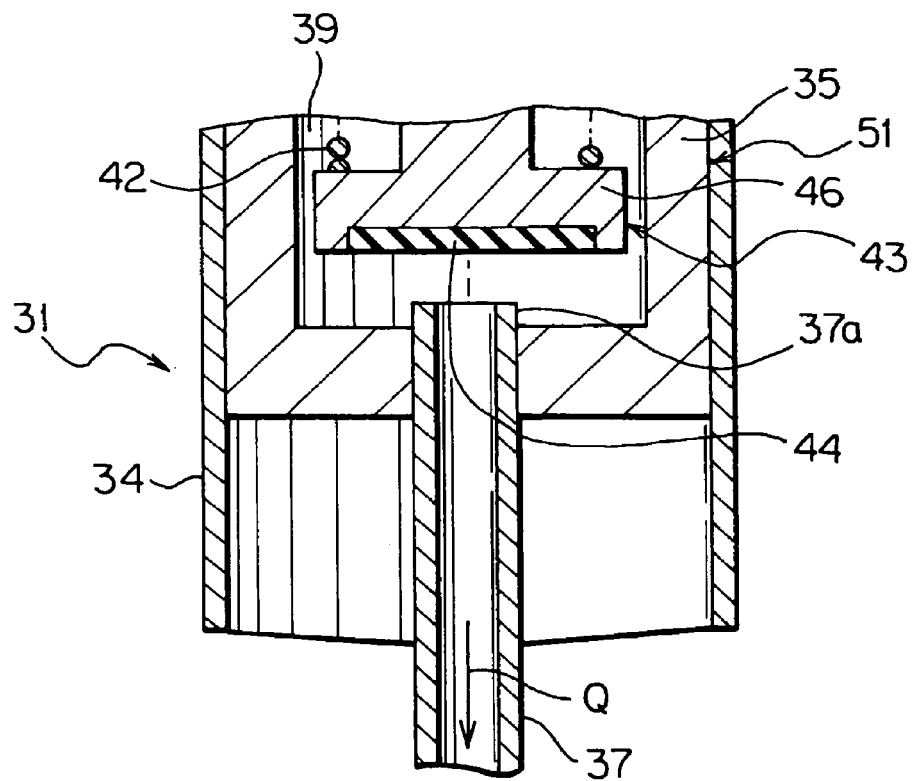

Thus, the valve element 44 approaches or leaves the base end 37a between the opening position shown as a two-dot chain line in FIG. 4 and FIG. 5B and the closing position shown as a solid line in FIG. 4 and FIG. 5A. At the opening position, the valve 44 leaves the base end 37a, so that the coloring material may flow through the nozzle member 37 so as to be spouted toward the outer surface 3a of the wire 3.

At the closing position, the valve 44 contacts the base end 37a, so that the coloring material may not flow through the nozzle member 37 to be spouted toward the outer surface 3a of the wire 3.

In this description, positioning the valve 44 to the opening position is referred to as "opening the electromagnetic valve 51", and positioning the valve 44 to the closing position is referred to as "closing the electromagnetic valve 51".

The coil spring 42 energizes the disc 46 in such a direction that the valve 44 approaches the base end 37a of the nozzle member 37.

As shown as a two-dash chain line in FIG. 4 and FIG. 5B, the opened electromagnetic valve 51 spouts the coloring material onto the outer surface 3a of the wire 3. As shown as a solid line in FIG. 4 and FIG. 5A, the closed electromagnetic valve 51 stop spouting the coloring material onto the outer surface 3a of the wire 3.

The coloring nozzle 31 having the above-described constitution leads the coloring material from the coloring material supply source 32 to the flow pass 39 through the inlet pipe 36. Then, with the energizing force of the coil spring 42 and without applying voltage to the coil 40, the valve 44 contacts the base end 37a, and the coloring material is stored in the flow pass 39.

Further, in the coloring nozzle 31, when the spike voltage A (shown in FIG. 8) is applied to the coil 40, the valve 44 attached to the disc 46 leaves the base end 37a of the nozzle member 37 against the energizing force of the coil spring 42. Then, the coloring material stored in the flow pass 39 flows through the interior of the nozzle member 37 along the arrow Q. Then, the coloring nozzle 31 spouts the coloring material from the nozzle member 37. Further, after a predetermined time "a" is passed from when the spike voltage A is applied, a hold voltage B (shown in FIG. 8), lower than the spike voltage A, is applied to the coil 40.

The hold voltage B is continuously applied to the coil 40 by the driving circuit 64, when a later-described signal is inputted to the driving circuit 64. The hold voltage B is not applied to the coil 40 when the signal is not inputted to the driving circuit 64. When the hold voltage B is not applied to the coil 40, the valve 44 approaches and contacts the base end 37a of the nozzle member 37 by the energizing force of the spring coil 42. Thus, the coloring nozzle 31 spouts the coloring material onto the outer surface 3a of the wire 3 with a specific amount of the coloring material at a time.

In addition, the spike voltage A is relatively high for opening the electromagnetic valve 51 from the closing state. Namely, the spike voltage A is a voltage to be applied to the coil 40, and required for opening the closed electromagnetic valve 51 (for transferring the valve 44 against the energizing force of the coil spring 42). The hold voltage B is a relatively low voltage for keeping the electromagnetic valve 51 open, and lower than the spike voltage A. Namely, the hold voltage B is a voltage to be applied to the coil 40, and required for keeping the electromagnetic valve 51 open (for keeping the valve 44 apart from the base end 37a against the energizing force of the coil spring 42).

Further, as described before, the coloring nozzle 31 opens or closes the electromagnetic valve 51 corresponding to whether the voltages are applied or not. Therefore, when a time interval of the voltages applying to the coil 40 is shorter than a predetermined time, a valve 44 open-close operation of the electromagnetic valve 51 cannot follow the interval, and the electromagnetic valve 51 keeps opening the valve 44. In this description, an upper-limit frequency of the valve 44 which an open-close operation of the electromagnetic valve 51 can follow is referred to as "specific frequency". Accordingly, when the frequency is higher than the specific frequency which the valve 44 open-close operation of the electromagnetic valve 51 can follow, the electromagnetic valve 51 in the coloring nozzle 31 is left open.

The coloring nozzle 31 spouts the liquid coloring material fed from the coloring material supply source 32 toward the outer surface 3a of the wire 3 with a specific amount of the coloring material at a time. The coloring nozzle 31 allows the spouted liquid drop or drops to adhere to outer surface 3a of the wire 3 so as to color (or mark) at least a part of the outer surface 3a of the wire 3.

Figure 3:
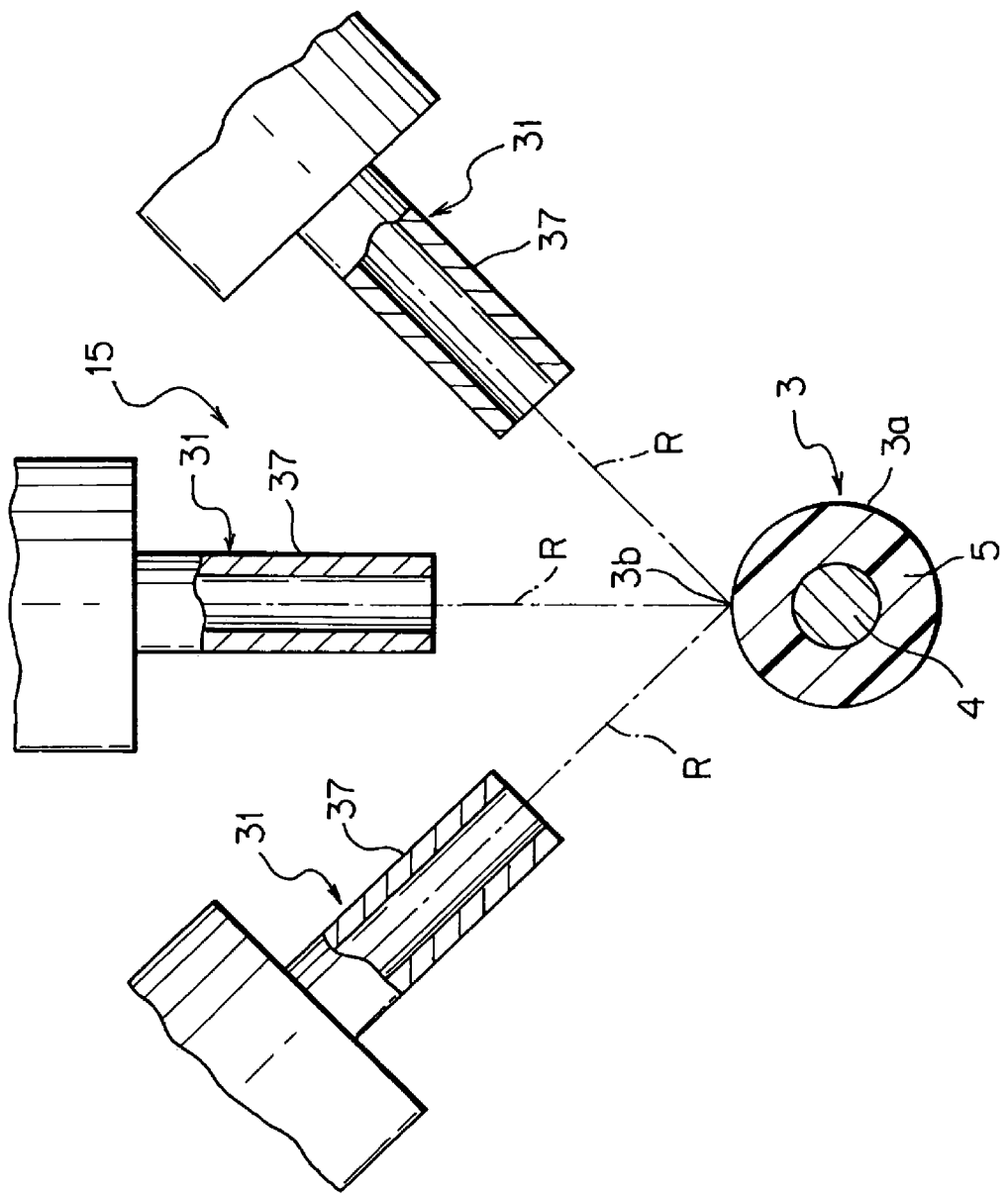
FIG. 3 is an explanatory view showing a positional relation of coloring nozzles of the coloring unit shown in FIG. 2 and an electric wire.

When the coloring nozzles 31 are attached to the unit body 30, the coloring nozzles 31 are arranged in the transferring direction K, and in a circumferential direction of the wire 3. As shown 1, five coloring nozzles 31 of the unit body 30 are arranged in the transferring direction K of the wire 3, and as shown in FIGS. 2 and 3, three coloring nozzles 31 are arranged in the circumferential direction of the wire 3.

Each coloring nozzle 31 is held by the unit body 30 on a condition that the most upper part 3b of the wire 3 is situated on an extension of the axis R (shown with an alternate long and short dash line in FIG. 3) of the nozzle members 37. Each coloring nozzle 31 spouts the coloring material along the axis R. That is, each coloring nozzle 31 spouts the coloring material onto the most upper part 3b of the wire 3 with the specific amount of the coloring material at a time. Each coloring nozzle 31 is a coloring member.

Each coloring material supply source 32 receives the coloring material therein, and supplies the coloring material into the later-described inlet pipe 36 of the corresponding coloring nozzle 31. Each coloring material supply sources 32 has a corresponding coloring nozzle 31. The colors T of the coloring materials to be supplied to the coloring nozzles 31 from the respective coloring material supply sources 32 may be different from one another, or alternatively, may be the same one another.

Each pressurized gas supply source 33 supplies pressurized gas into the corresponding coloring material supply source 32, thereby when each later-described valve 44 of the corresponding coloring nozzle 31 leaves the corresponding base end 37a of the nozzle member 37, the coloring material in the flow pass 39 is promptly spouted from the nozzle member 37.

In the coloring unit 15, when the later-described spike voltage A is applied and then the later-described hold voltage B is applied to the coil 40 of the desired coloring nozzle 31 according to the signal from the control device 19 or the design memory unit 52, the valve 44 leaves the base end 37a of the first nozzle member 37. Then, the coloring unit 15 spouts the coloring material in the flow pass 39 of the desired coloring nozzle 31 toward the outer surface 3a of the wire 3 with a specific amount of the coloring material at a time.

In this description, the coloring material of which consistency is, for example, lower than 30 milipascal second (mPa*s) is used. The coloring material means a liquid substance, in which a coloring material (organic substance for use in industry) is dissolved and dispersed in water or other solvent. The organic substance described above is a dye or a pigment (most of them being organic substances and synthetic substances). Sometimes, a dye is used as a pigment and a pigment is used as a dye. As an example, the coloring material is a coloring liquid or coating material.

The coloring liquid is a liquid, in which a dye is dissolved or dispersed in a solvent. The coating material is a material, in which a pigment is dispersed in a liquid dispersion. When the coloring liquid adheres to the outer surface 3a of the wire 3, the dye permeates into the coating 5. When the coating material adheres to the outer surface 3a of the wire 3, the pigment adheres to the outer surface 3a without permeating into the coating 5. That is, the coloring unit 15 dyes a part of the outer surface 3a of the wire 3 with a dye or coats a part of the outer surface 3a of the wire 3 with a pigment. That is, "to color the outer surface 3a of the wire 3" means to dye a part of the outer surface 3a of the wire 3 with a dye or to coat a part of the outer surface 3a of the wire 3 with a pigment.

Preferably, the solvent and liquid dispersion have an affinity to the synthetic resin that constitutes the coating 5 in order to securely permeate the dye into the coating 5 or to allow the pigment to securely adhere to the outer surface 3a.

The "spouting" described above means that the liquid coloring material in a state of the liquid drop is ejected vigorously from the coloring nozzle 31 toward the outer surface 3a of the wire 3.

The duct 16 is mounted on the delivery rolls 12 side of the coloring unit 15 in between the coloring unit 15 and the delivery rolls 12. Namely, the duct 16 is disposed downstream of the coloring unit 15 and upstream of the delivery rolls 12 in the transferring direction K of the wire 3. The duct 16 has a cylinder shape, and the wire 3 is passed through the duct 16. A not-shown aspirating member such as a vacuum pump is connected to the duct 16. The aspirating member aspirates a gas in the duct 16 to prevent the solvent or the liquid dispersion of the coloring material from filling the outside of the coloring apparatus 1.

The encoder 17 is disposed downstream of the delivery rolls 12 in the transferring direction K of the wire 3. As shown in FIG. 1, the encoder 17 includes a pair of rotors 47. The rotors 47 are supported rotatably around axes of the rotors 47. Outer circumferential surfaces of the rotors 47 contact the outer surface 3a of the wire 3, which is held between the pair of delivery rolls 12. When the core wire 4, namely, the wire 3 is forwarded along the arrow K, the rotors 47 are rotated. The transferred length of the wire 3 along the arrow K is proportional to the number of revolutions of the rotors 47.

The encoder 17 is connected to the design memory unit 52. When the rotors 47 rotate by a specific angle, the encoder 17 outputs a pulse signal shown in FIGS. 9 (b), 10 (b), 11(b) to the design memory unit 52. That is, the encoder 17 measures data corresponding to the transferred length of the wire 3 along the arrow K and outputs the data to the design memory unit 52. Normally, the encoder 17 outputs the pulse signal corresponding to the transferred length of the wire 3 with the aid of the friction between the wire 3 and the rotor 47. However, when the transferred length of the wire 3 does not coincide with the number of the pulse due to a condition of the outer surface 3a of the wire 3, the speed data of the movement of the wire 3 may be obtained from another way for feedback or carry out a comparative operation.

The design memory unit 52 is a computer that includes a well-known RAM, a ROM, a CPU and the like. The data corresponding to the transferred length of the wire 3 from the encoder 17 (the pulse signal shown in FIGS. 9 (b), 10 (b), 11(b)) is inputted to the design memory unit 52. The design memory unit 52 stores a pattern of the mark 6 to be formed on the outer surface 3a of the wire 3. The design memory unit 52 outputs spout timing data for each coloring nozzle 31 (timing data for spouting) to both the controller 19 and the driving circuit 64 via an OR circuit 63.

Specifically, the design memory unit 52 stores data about whether the coloring nozzle 31 is to spout or not corresponding to each pulse signal from the encoder 17. When the specific pulse signal that the coloring nozzle 31 should spout is inputted from the encoder 17, the design memory unit 52 outputs the data for spouting (the pulse signal shown in FIGS. 9C, 10C, 11C) to both the controller 19 and the driving circuit 64 via the OR circuit 63. The design memory unit 52 stores a series of pulse signals to make the coloring nozzle 31 spout from the encoder 17. When the series of the pulse signals is inputted, the design memory unit 52 output the pulse signal shown in FIGS. 9C, 10C, 11C to both the controller 19 and the driving circuit 64 via the OR circuit 63.

Namely, the design memory unit 52 judges whether it is the time to spout from the coloring nozzle 31 or not according to the data from the encoder 17. When judging it is the time to spout from the coloring nozzle 31, the design memory unit 52 outputs the pulse signals shown in FIGS. 9C, 10C, 11C to both the controller 19 and the driving circuit 64 via the OR circuit 63.

In this embodiment shown in FIGS. 9 to 11, each dot 7 of the mark 6 corresponds to one pulse signal from the encoder 17, and to one pulse signal from the design memory unit 52 to the controller 19. As shown in FIGS. 9 to 11, the first to seventh, eighth to tenth pulses from the encoder 17 shown in FIGS. 9 (b), 10 (b), 11(b) correspond to the dots 7 of mark 6.

When the first to seventh, eighth to tenth pulses from the encoder 17 correspond to the dots 7 of mark 6 described above are inputted, the design memory unit 52 outputs the pulse signals shown in FIGS. 9C, 10C, 11C to both the controller 19 and the driving circuit 64 via the OR circuit 63.

Thus, the design memory unit 52 generates the signals for spouting the coloring material from the coloring nozzle 31 according to the transferred length of the wire 3 detected by the encoder 17, and outputs the signals to both the controller 19 and the driving circuit 64 via the OR circuit 63. The encoder 17 and the design memory unit 52 constitute a signal generator 53 in this description.

The cutting machine 18 is disposed downstream of the pair of rotors 47 of the encoder 17 in the transferring direction K of the wire 3. The cutting machine 18 includes the pair of cutting blades 48, 49. The pair of cutting blades 48, 49 is arranged in a vertical direction. The pair of cutting blades 48, 49 approaches and leaves each other at the same time vertically. When approaching each other, the pair of cutting blades 48, 49 catches and cuts the wire 3 transferred by the delivery rolls 12 in between the cutting blades 48, 49. Then, the pair of cutting blades 48, 49 leaves each other and leaves the wire 3.

Figure 6:
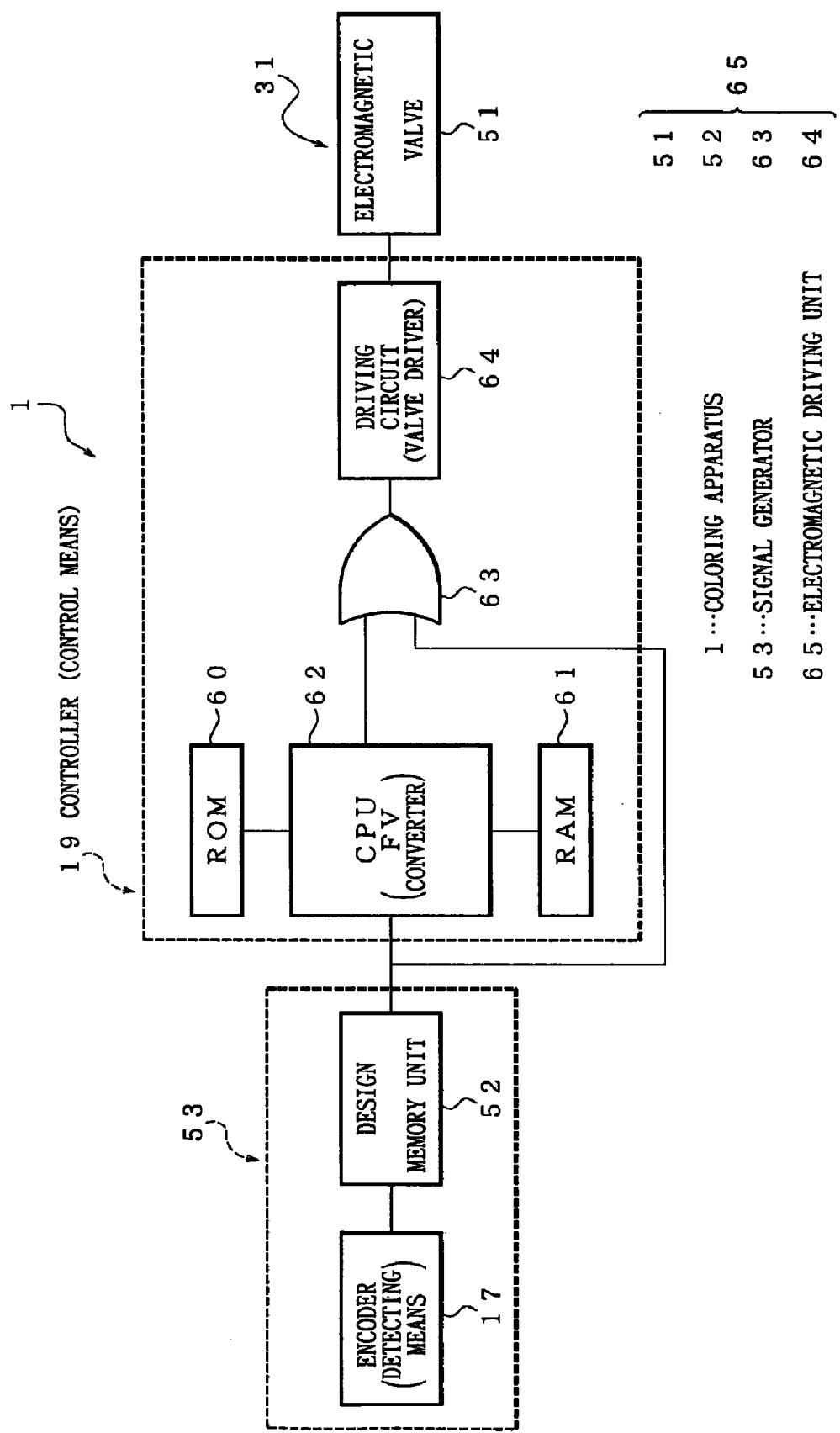
FIG. 6 is an explanatory view mainly showing a configuration of a controller of the apparatus for coloring electric wire shown in FIG. 1.

As shown in FIG. 6, the controller 19 is a computer that includes a well-known ROM (read-only memory) 60, a ROM (random access memory) 61, the CPU (central processing unit) 62 as both an FV (frequency to voltage) converter and a voltage superimposing unit, the OR circuit 63, the driving circuit 64 as a valve driver and the like. The controller 19 is connected to the delivery rolls 12, the signal generator 53, the cutting machine 18, the coloring nozzles 31, and the like. By controlling them, the controller 19 controls the whole coloring apparatus 1.

The ROM 60 stores an operation program of the CPU 62. The RAM 62 temporarily stores data required for carrying out the operation of the CPU 62.

The pulse signals for spouting the coloring material from the coloring nozzle 31 is inputted from the design memory unit 52 to the CPU 62. The CPU 62 measures a time interval between the pulse signal inputted from the design memory unit 52 and the next pulse signal for calculating a frequency of the signals from the design memory unit 52. Only when the calculated frequency is higher than the specific frequency, the CPU 62 outputs signals shown in FIGS. 9D and 10D to the driving circuit 64 via the OR circuit 63. Here, the signals shown in FIGS. 9D and 10D works for keeping the electromagnetic valve 51 open. On the other hand, when the calculated frequency is lower than the specific frequency, the CPU 62 outputs no signal to the driving circuit 64 via the OR circuit 63.

The CPU 64, namely, the controller 19 for outputting the signals described above to the driving circuit 64 via the OR circuit 63 constitutes a controller for controlling the driving circuit 64 in this description.

The CPU 62 and the design memory unit 52 are connected to inputs of the OR circuit 63. The driving circuit 64 is connected to an output of the OR circuit 63. The OR circuit 63 outputs at least one of the signals from the CPU 62 and the design memory unit 52 to the driving circuit 64.

The number of the driving circuits 64 is equal to that of the coloring nozzles 31. Each driving circuit 64 corresponds to each coloring nozzle 31. The driving circuit 64 is connected to the coil 40 of the electromagnetic valve 51 of the corresponding coloring nozzle 31. When the signal is inputted from the OR circuit 63, the driving circuit 64 applies the spike voltage A shown in FIG. 8 to the coil 40 for a predetermined time "a". After the predetermined time "a" is passed from applying the spike voltage A to the coil 40, the driving circuit 64 applies the hold voltage B to the coil 40. The driving circuit 64 keeps applying the hold voltage B to the coil 40, when the signals described above are inputted to the OR circuit 63, namely, the signals from the OR circuit 63 are inputted to the driving circuit 64.

Thus, the driving circuit 64 applies to the coil 40, the spike voltage A for opening the electromagnetic valve 51, and after the electromagnetic valve 51 is open, the driving circuit 64 continuously applies the hold voltage B for keeping the electromagnetic valve 51 open. Namely, when at least one of the signal inputted from the signal generator 53 for spouting the coloring material from the coloring nozzle 31 and the signal for keeping the electromagnetic valve 51 open from the CPU 62, the driving circuit 64 applies to the coil 40, the spike voltage A, and then the hold voltage B when at least the one of the signals is inputted to the driving circuit 64. Further, by outputting the signals to the driving circuit 64 via the OR circuit 63, the CPU 62 makes the driving circuit 64 continuously apply the hold voltage B to the coil 40 when the frequency higher than the specific frequency for the valve openclose operation of the electromagnetic valve 51 is inputted. Thus, by outputting the signals to the driving circuit 64 via the OR circuit 63, the CPU 62 makes the driving circuit 64 continuously apply the hold voltage B to the coil 40 when the frequency higher than the specific frequency is inputted.

The electromagnetic valve 51, the driving circuit 64, the OR circuit 63, the CPU 62, and the design memory unit 52 constitute an electromagnetic valve driving unit 65 in this description.

Thus, the driving circuit 64 opens or closes the electromagnetic valve 51 of the coloring nozzle 31 by means of whether applying the spike voltage A and the hold voltage B or not.

For making the coloring apparatus 1 form the mark 6 on the outer surface 3a of the wire 3, namely, color the outer surface 3a of the wire 3, firstly the pattern of the mark 6 for forming on the outer surface 3a of the wire 3 is inputted to the design memory unit 52. Then, voltages as the spike voltage A and the hold voltage, and the time "a" for applying the spike voltage A are inputted to the controller 19.

Then, the guide roll 11 is mounted on the frame 10. After cutting blades 48, 49 are set apart from each other, the wire 3 rolled on the guide roll 11 is passed through the straightening unit 13, the slack absorbing unit 14, the coloring unit 15 and the duct 16 sequentially and caught in between the pair of delivery rolls 12. Then, each of the coloring nozzle 31 is attached to a predetermined position of the corresponding unit body 30 of the coloring unit 15, and connected to the corresponding coloring material supply source 32. Then, each of the coloring nozzle 31 is connected to the corresponding pressurized gas supply source 33. Then, the aspirating member aspirates the gas in the duct 16.

Then, by rotating the delivery rolls 12, the wire 3 is pulled out of the guide roll 11, and transferred in the longitudinal direction of the wire 3. Simultaneously, the straightening unit 13 gives friction owing to the first energizing force H1 to hold the wire 3 in tension. Then, the air cylinder 27 energizes the movable roller 26, namely, the wire 3 with the second energizing force H2.

Then, the encoder 17 outputs the pulse signals shown in FIGS. 9 (b), 10 (b), and 11(b) to the design memory unit 52. When the pulse signals to spout the coloring material from the coloring nozzle 31 is inputted from the encoder 17 with a timing to spout, the design memory unit 52 outputs to both the CPU 62 and the OR circuit 63 the pulse signals shown in FIGS. 9C, 10C, and 11C with the timing to spout according to the predetermined pattern stored in the design memory unit 52.

Then, the CPU 62 calculates the frequency of the pulse signals from the design memory unit 52. When judging that the calculated frequency is higher than the specific frequency, the CPU 62 outputs the signal shown in FIGS. 9D, 10D, and 11D via the OR circuit 63 to the driving circuit 64 when the calculated frequency is judged to be over the specific frequency.

Incidentally, FIG. 9D shows a case that a frequency of the first to seventh pulse signals shown in FIG. 9C is higher than the specific frequency, and a frequency of the eighth to tenth pulse signals is higher than the specific frequency. Further, FIG. 10D shows a case that a frequency of the second to seventh pulse signals is higher than the specific frequency and a frequency of the first to second, eighth to tenth pulse signals shown in FIG. 10C is lower than the specific frequency. Further, FIG. 11D shows a case that frequencies of all the pulse signals shown in FIG. 11C are lower than the specific frequency. Incidentally, in FIGS. 9 to 11, each pair of dot 7 and corresponding pulse signal is connected with dash line.

The signal inputted to the OR circuit 63 is outputted to the driving circuit 64. When receiving the signal outputted from the OR circuit 63, the driving circuit 64 outputs the spike voltage A to the coil 40, and after the specific time "a" is passed, the driving circuit 64 outputs the hold voltage B when the signal is input from the OR circuit 63. Namely, when the signal shown in FIG. 9D is inputted from the CPU 62 to the driving circuit 64, the driving circuit 64 outputs the spike voltage A and the hold voltage B to the coil 40 as shown in FIG. 9E.

Similarly, when the signal shown in FIG. 10D is inputted from the CPU 62 to the driving circuit 64, the driving circuit 64 outputs the spike voltage A and the hold voltage B to the coil 40 as shown in FIG. 10E. Similarly, when the signal shown in FIG. 11D is inputted from the CPU 62 to the driving circuit 64, the driving circuit 64 outputs the spike voltage A and the hold voltage B to the coil 40 as shown in FIG. 11E. Thus, the driving circuit 64 outputs the spike voltage A and continuously outputs the hold voltage B when the frequency from the design memory unit 52 is higher than the specific frequency, namely, the valve open-close frequency which the valve 44 open-close operation of the electromagnetic valve 51 can follow. Thus, the coloring nozzle 31 spouts the coloring material onto the outer surface 3a of the wire 3 with a specific amount of the coloring material at a time.

Then, the solvent or the liquid dispersion is evaporated from the coloring material adhered on the outer surface 3a of the wire 3, thereby the outer surface 3a of the wire 3 is dyed with the dye or coated with the pigment. Incidentally, as shown in FIGS. 9 (a) and 10 (a), when the frequency of the pulse signals outputted from the encoder 17 is higher than the specific frequency, the dots 7 continues to each other, so that the mark 6 becomes a straight line. The aspirating member aspirates the solvent or the liquid dispersion evaporated from the coloring material adhered on the outer surface 3a of the wire 3 through the duct 16. Thus, the surface 3a of the wire 3 is colored.

When judging that a specific length of the wire 3 is delivered according to the data from, for example, the encoder 17, the controller 19 stops the rolling of the delivery roll 12. Then, the wire 3 slacks particularly in between the pair of guiding rollers 24 of the slack absorbing unit 14, and the movable roller 26 energized with the second energizing force H2 is transferred to the position shown as a two-dot chain line in FIG. 1. Then, the extendable rod 29 of the air cylinder 27 of the slack absorbing unit 14 extends. Thus, the slack absorbing unit 14 absorbs the slack of the wire 3.

Then, the pair of cutting blades 48, 49 approaches each other and cuts the wire 3. Thus, the wire 3 having a mark 6 on the outer surface 3a as shown in FIG. 7 is obtained.

According to this embodiment, when the signals from the signal generator 53 is higher than the specific frequency, the CPU 62 outputs to the driving circuit 64 the signal for keeping the electromagnetic valve 51 open. When the signal is inputted from the CPU 62, the driving circuit 64 outputs the spike voltage A and then continuously outputs the hold voltage B to the coil 40.

Namely, when the frequency is higher than the specific valve open-close frequency which the valve 44 open-close operation of the electromagnetic valve 51 can follow, the CPU 62 makes the driving circuit 64 output the spike voltage A and then continuously outputs the hold voltage B to the coil 40. Therefore, when the frequency to be applied to the coil 40 is higher than the specific frequency, the voltage applied to the solenoid when the valve keeps opening is reduced. This prevents the coil 40 from heating, and a lifetime of the electromagnetic valve 51 can be increased.

Further, when the signal inputted from the CPU 62 is stopped, the driving circuit 64 stops applying the hold voltage B to the coil 40. Therefore, the coloring material can be spouted according to the signal inputted from the signal generator 53. Therefore, the electric wire 3 is marked in a predetermined desired pattern.

The signal generator 53 generates the signals for spouting the coloring material according to the transferred length of the wire 3. Accordingly, the intervals for spouting become shorter when the transfer speed of the wire 3 becomes faster, and the intervals become longer when the transfer speed of the wire 3 becomes slower. Therefore, even when the transfer speed is changed, a specific mark can be marked on the wire 3.

While the wire 3 is forwarded in the longitudinal direction of the wire 3 relative to the coloring nozzle 31, the coloring nozzle 31 spouts the coloring material onto the wire 3 with a specific amount of the coloring material at a time. Thus, the coloring nozzle 31 colors the wire 3, when the wire is forwarded relative to the coloring nozzle 31. Therefore, the wire 3 does not need to stop for coloring, so that its workability is not reduced. Further, when the wire 3 is forwarded relative to the coloring nozzle 31, the coloring nozzle 31 spouts toward the wire 3 with a specific amount of the coloring material. Therefore, optional positions of the wire 3 can be colored continuously.

The encoder 17 measures data corresponding to the transferred length of the wire 3 and the controller 19 controls the coloring nozzle 31 according to the transferred length of the wire 3. Therefore, the controller 17 shortens a time interval of the spouting of the coloring material from the coloring nozzle 31 when the transfer speed of the wire 3 increases, when the controller 15 elongates a time interval of the spouting of the coloring material from the coloring nozzle 31 when the transfer speed of the wire 3 decreases. Thus, if the transfer speed of the wire 3 changes, the controller 17 can keep the spots of the coloring materials adhering to the outer surface 3a of the wire 3 in specific intervals.

Thus, if the transfer speed of the wire 3 changes, the controller 17 can make the coloring materials adhere to the outer surface 3a of the wire 3 according to a predetermined pattern. Namely, even if the transfer speed of the wire 3 changes, the controller 17 can color the wire 3 according to a predetermined pattern.

In the present invention, as the coloring liquid or coating material, various material may be used, such as acrylic coating material, ink (dye or pigment) and UV-ink.

In this embodiment, the electromagnetic valve 51 is used for spouting the coloring material. However, according to the present invention, the electromagnetic valve 51 may be applied to various fields. In this embodiment, computers are used as the controller 19 and the design memory unit 52. However, according to the present invention, electric circuits may be used as the controller 19 and the design memory unit 52. In this embodiment, the pulse signals outputted from the encoder 17, the design memory unit 52 and the dots 7 of the mark 6 correspond one-to-one to each other. However, such pulse signals and the dots 7 may not correspond one-to-one to each other.

The aforementioned preferred embodiments are described to aid in understanding the present invention and variations may be made by one skilled in the art without departing from the spirit and scope of the present invention.

INDUSTRIAL APPLICABILITY

As described above, according to the present invention as claimed in claim 1, when the requested frequency is higher than the upper-limit of the valve open-close frequency, a total amount of voltage applied to the solenoid to open the valve is reduced. This prevents the solenoid from heating, and a lifetime of the electromagnetic valve can be increased.

According to the present invention as claimed in claim 2, when the requested frequency is higher than the upper-limit of the valve open-close frequency, a total amount of voltage applied to the solenoid to open the valve is reduced. This prevents the solenoid from heating, and a lifetime of the electromagnetic valve can be increased.

According to the present invention as claimed in claim 3, when the requested frequency is higher than the upper-limit of the valve open-close frequency, a total amount of voltage applied to the solenoid to open the valve is reduced. This prevents the solenoid from heating, and a lifetime of the electromagnetic valve can be increased.

According to the present invention as claimed in claim 4, when the requested frequency is higher than the upper-limit of the valve open-close frequency, a total amount of voltage applied to the solenoid to open the valve is reduced. This prevents the solenoid from heating, and a lifetime of the electromagnetic valve can be increased.

Further, when neither the signal from the FV converter nor the signal from the signal generator is inputted into the valve driver, the valve driver stops applying the hold voltage to the solenoid. Therefore, the coloring material can be spouted according to the signal inputted from the signal generator. Therefore, the electric wire is marked in a predetermined desired pattern.

According to the present invention as claimed in claim 5, the signal generator generates the signal for spouting the coloring material according to the transferred length of the wire. Therefore, even if the transfer speed is changed, a specific marking is marked on the wire.

The invention claimed is:

1. A driving method of an electromagnetic valve of a coloring nozzle of an apparatus for coloring electric wire comprising the steps of:
    applying a spike voltage to a solenoid for opening an electromagnetic valve; and
    applying a hold voltage for keeping the electromagnetic valve open, said hold voltage being lower than the spike voltage,
    whereby when a requested valve open-close frequency is higher than an upper-limit of a valve open-close frequency, the spike voltage is first applied, then the hold voltage is continuously applied to the solenoid.

2. A driving unit for driving an electromagnetic valve of a coloring nozzle of apparatus for coloring electric wire comprising:
    an electromagnetic valve including a solenoid; and
    a controller including a valve driver for applying a spike voltage to the solenoid when opening the valve, and applying a hold voltage to the solenoid when keeping the valve open,
    whereby said controller further includes a voltage superimposing unit to make the valve driver keep applying the hold voltage to the solenoid, when a requested valve open-close frequency is higher than an upper-limit of a valve open-close frequency.

3. An apparatus for coloring electric wire comprising:
    a coloring unit for coloring an electric wire by spouting a liquid coloring material onto an outer surface of the wire, said spouted coloring material adhering to the outer surface of the wire;
    an electromagnetic valve included in the coloring unit, said electromagnetic valve being open to spout the coloring material onto the outer surface of the wire, and closed to stop spouting the coloring material onto the outer surface of the wire; and
    a controller included in the coloring unit, and including a valve driver, said valve driver applying a spike voltage to a solenoid in order to open the valve and a hold voltage to the solenoid in order to keep the valve open,
    whereby said controller further includes a voltage superimposing unit to make the valve driver keep applying the hold voltage to the solenoid, when a requested valve open-close frequency is higher than an upper-limit of a valve open-close frequency.

4. The apparatus for coloring electric wire as claimed in claim 3, further comprising a signal generator for generating a signal to spout the coloring material from a coloring nozzle, and outputting the signal to both the voltage superimposing unit and the valve driver,
    wherein when the requested valve open-close frequency is higher than the upper-limit of the valve open-close frequency, said voltage superimposing unit outputs a signal to the valve driver for keeping the valve open,
    wherein when receiving at least one of the signal from the signal generator to spout the coloring material from the coloring nozzle and the signal from the voltage superimposing unit to keep the valve open, the valve driver first applies the spike voltage to the solenoid, then continuously applies the hold voltage to the solenoid during a period of receiving at least one of the signals.

5. The apparatus for coloring electric wire as claimed in claim 4, further comprising:
    a transporter for transporting the wire in a longitudinal direction of the wire; and
    a detector, included in the signal generator, for detecting a transferred length of the wire,
    wherein the signal generator generates a signal to spout the coloring material from the coloring nozzle based on the transferred length of the wire detected by the detector.

* * * * *